July 9, 1946.  M. WATTER  2,403,569
FABRICATED METAL STRUCTURE
Filed June 16, 1943  4 Sheets-Sheet 1
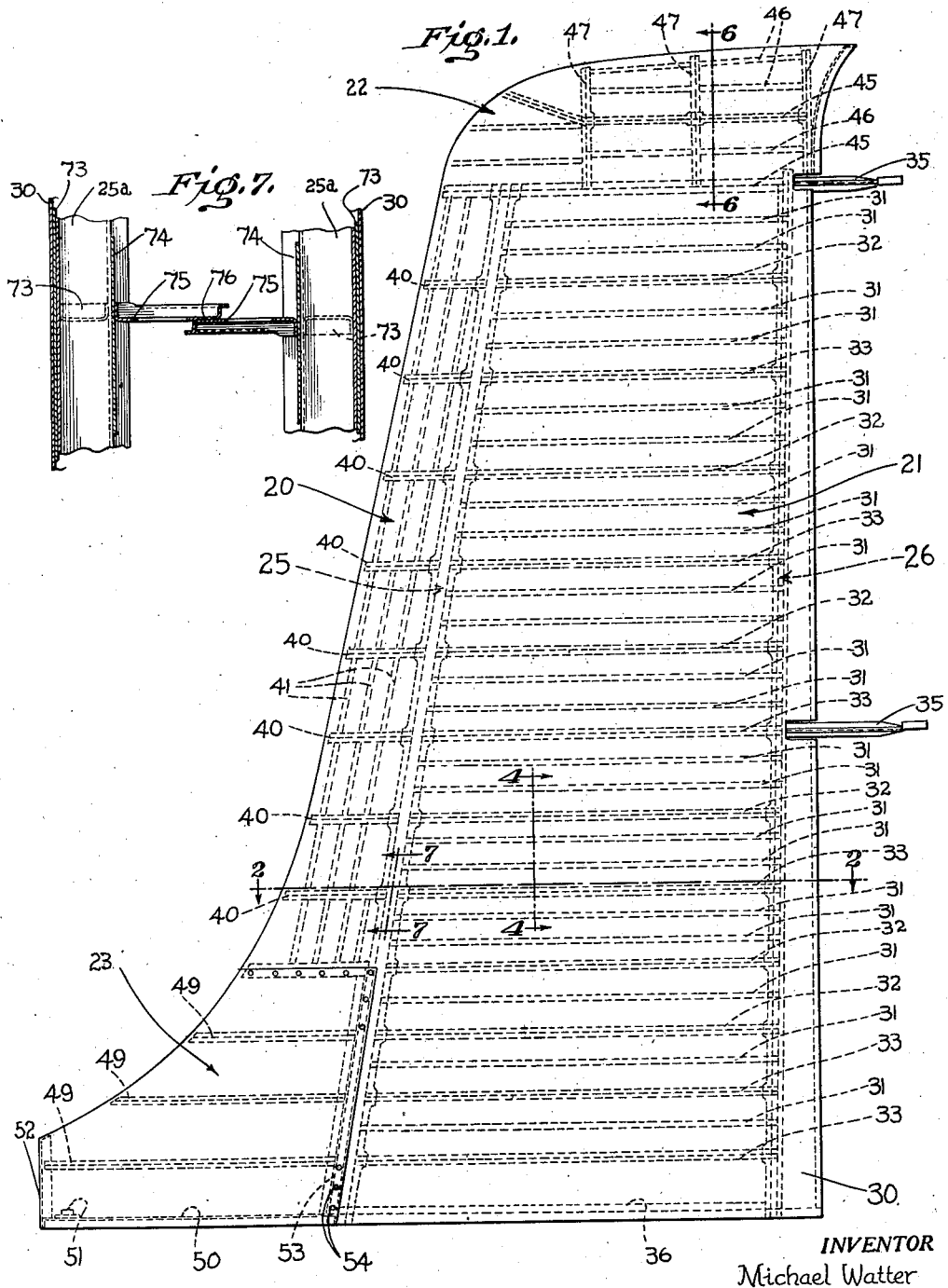
INVENTOR
Michael Watter
BY John P. Tarbox
ATTORNEY July 9, 1946. M. WATTER 2,403,569
FABRICATED METAL STRUCTURE
Filed June 16, 1943 4 Sheets-Sheet 2
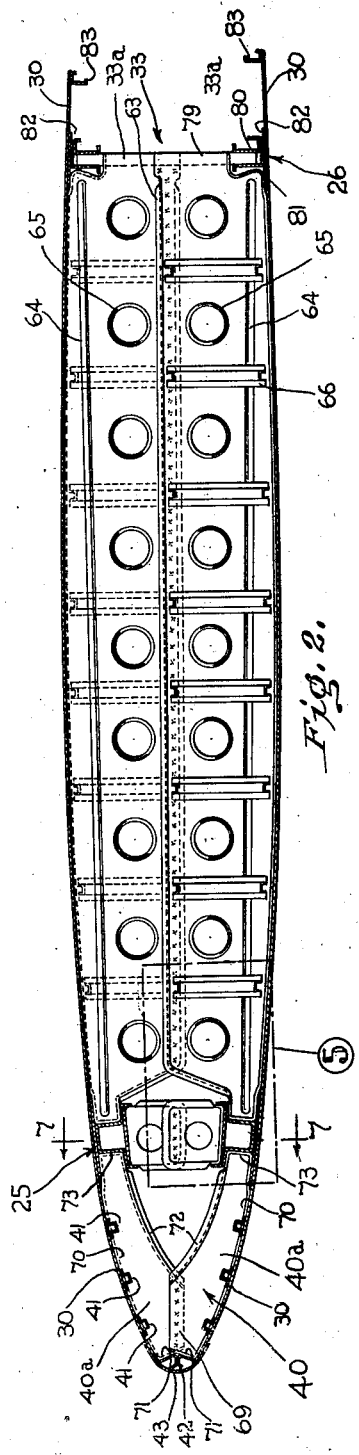
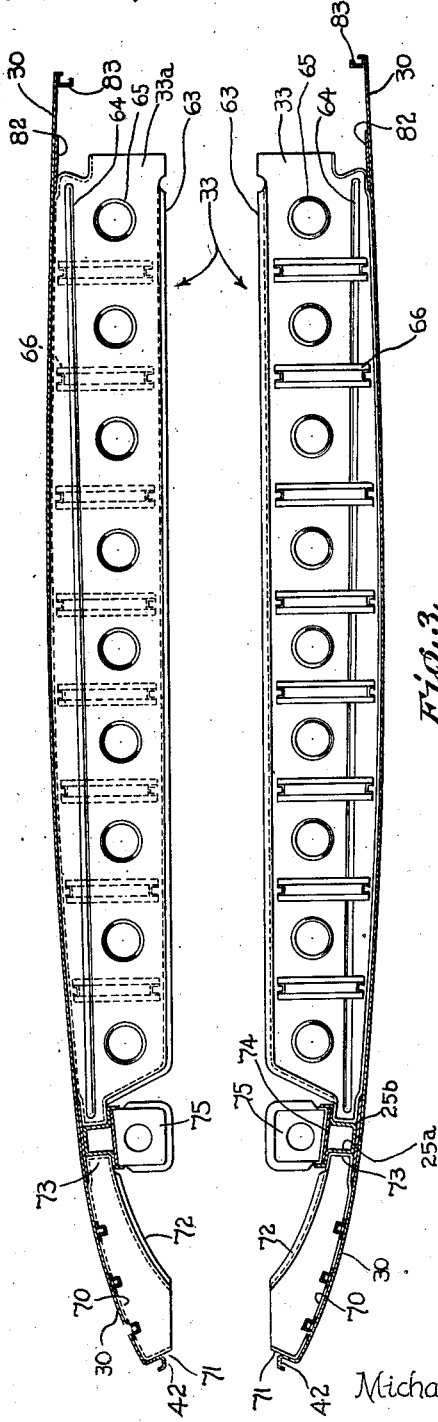
INVENTOR
Michael Watter.
BY John P. Tarbox
ATTORNEY July 9, 1946.                M. WATTER                 2,403,569
                      FABRICATED METAL STRUCTURE
                      Filed June 16, 1943          4 Sheets-Sheet 3
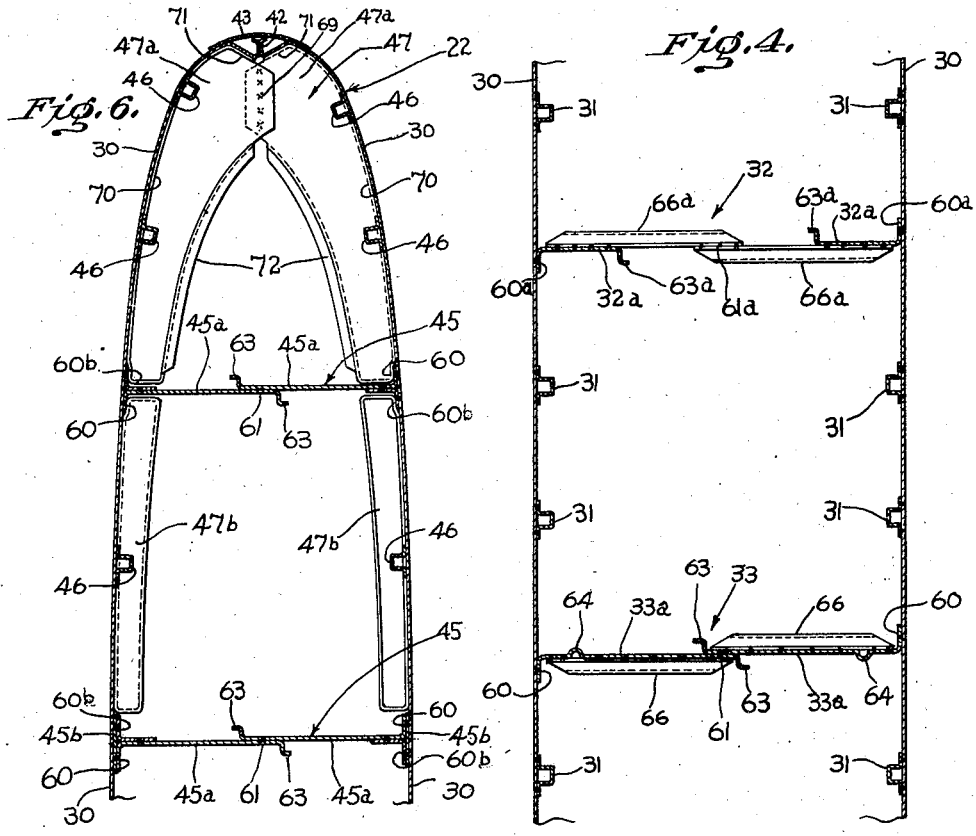
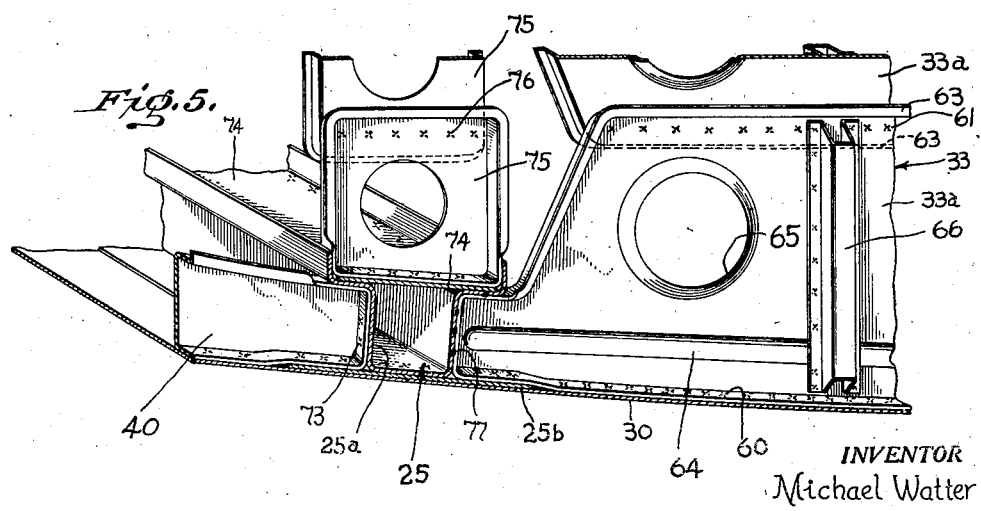
INVENTOR
Michael Watter
BY John P. Tarbox
ATTORNEY

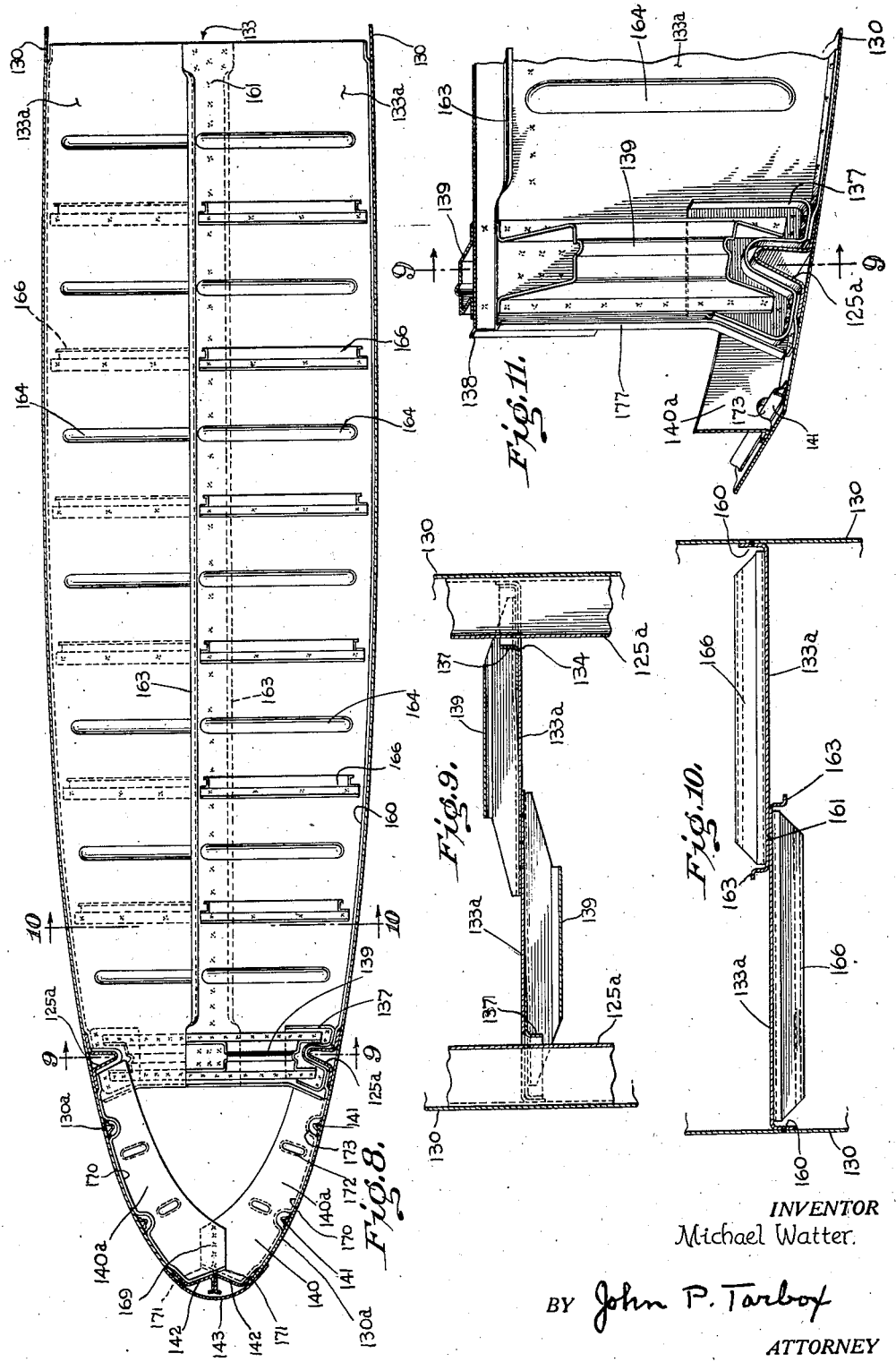

Patented July 9, 1946

2,403,569

UNITED STATES PATENT OFFICE 2,403,569

FABRICATED METAL STRUCTURE

Michael Watter, Philadelphia, Pa., assignor to Edward G. Budd Manufacturing Company, Philadelphia, Pa., a corporation of Pennsylvania Application June 16, 1943, Serial No. 491,034

11 Claims. (Cl. 244—124)

This invention relates to fabricated metal structures, particularly to an improved construction and method of assembly of airfoils and has for an object the provision of improvements in this art.

In the fabrication of skin-covered frame-supported structures, such as airfoils, from sheet metal, it is very desirable and economical to prepare sub-assemblies, which include portions of the covering skin and associated parts, and to unite these sub-assemblies to form larger sub-assemblies suitable for later forming unit groups. In this way the manufacturing operations may be widely divided among the greatest number of workers to secure the greatest speed of manufacture and the most favorable inspection methods.

The primary object of the present invention is to provide a structure of multi-part construction in which the parts comprising sub-assembly units are so arranged as to afford maximum facility for uniting such parts as ribs, stringers, and the like to the skin sheets, and the subsequent assembly and joinder of the sub-assembly units to form the completed unit.

Another object is that of providing sub-assembly units, such as bi-partite units, in which the parts comprising the same are so related that when associated and assembled together in a final assembly unit they afford a light weight unit of great strength capable of efficiently transferring the various stresses encountered in use.

The above-mentioned and other objects and advantages of the invention will be apparent from the following description of certain exemplary embodiments thereof which are illustrated in the accompanying drawings, wherein:

Fig. 1 is a side elevation of an airplane tail fin embodying the invention;

Fig. 2 is an enlarged horizontal section taken on the line 2—2 of Fig. 1;

Fig. 3 is a pre-assembly view of the parts shown in Fig. 2;

Fig. 4 is an enlarged partial vertical section taken on the line 4—4 of Fig. 1;

Fig. 5 is an enlarged fragmentary perspective view of parts shown within the enclosed area 5 of Fig. 2;

Fig. 6 is an enlarged vertical section of the fin tip taken on the line 6—6 of Fig. 1;

Fig. 7 is an enlarged vertical section taken on the line 7—7 of Figs. 1 and 2;

Fig. 8 is a section similar to Fig. 2 but showing a modification in a horizontal stabilizer fin;

Fig. 9 is an enlarged section taken on the line 9—9 of Figs. 8 and 11;

Fig. 10 is an enlarged section taken on the line 10—10 of Fig. 8; and

Fig. 11 is an enlarged fragmentary perspective view of parts shown within the enclosed area 11 of Fig. 8.

The invention is illustrated in connection with an airfoil for aircraft, as for example, a wing, aileron, fin, rudder, stabilizer, elevator, or the like; and specifically a tail fin in one embodiment and a horizontal stabilizer fin in another.

According to the present invention, the airfoil, certain forms of which are shown herein for the purpose of illustration, is made in mating parts such as half-shells which are later secured together to form a final assembly unit. Each parti-shell includes the skin, various skin stiffeners, and rib elements, together with spar elements near the nose or leading edge and provisions for spar elements near the trailing edge. The parts are so formed and arranged as to afford easy and rapid final assembly, as for example by the use of spot welding tongs inserted from one open edge of the airfoil.

Referring particularly to Figs. 1 and 4, the fin illustrated herein comprises a leading edge or nose section 20, a trailing section 21, a tip section 22, and a fuselage fairing section 23. The fairing section may be formed as a separate sub-unit which is attached later, hence the tail fin unit will be considered as a complete sub-unit without the fairing section. The fin includes a nose spar structure 25 and a rear spar structure 26. These are both indicated by dotted lines in Fig. 1. The nose spar structure is shown in Figs. 2 and 3, but the rear spar is omitted in Fig. 3 because it is convenient to insert this from the trailing edge after the half-shell sub-assemblies have been secured together.

As indicated for the full fin in Fig. 1 and as shown for a representative portion of the fin in Fig. 4, the airfoil includes the thin gauge metal skin 30 which is rigidified by parallel rib-like elements which may be of the same or different types. As here shown, different types of ribs are employed. There are small stiffeners or formers 31, open truss ribs 32, and full-web ribs 33. Where the rudder hinge brackets 35 are located the heavy full-web rib construction 33 is employed. At the base of the fin an especially heavy bulkhead type of rib construction 36 is employed but as this is similar in principle to the other heavy ribs it need not be specifically illustrated or described herein. Since it is not enclosed within the airfoil but is exposed at one end it may even be made as a single piece welded through outturned flanges to the assembly.

As shown in Fig. 1, the heavy ribs 32 and 33 are continued into the nose portion 20 as rib elements 40. Referring also to Fig. 2, skin stiffening stringers 41, which are disposed transversely of the rib elements 40 are also provided in the nose section. At the leading edge of the nose section the skin 30 is bent to form stringers 42 whose flanges extend forward for welding after the half-shells have otherwise been secured together. Of course, the strengthening and connecting elements 42 may be separate members attached to the skin, if desired. A nose skin sheet 43 is secured to the leading edges of the main skin sheets after the final assembly operation to conceal the stringers 42 and complete the airfoil contour of the finally assembled unit.

As shown in Figs. 1 and 6, the fin tip 22 is provided with ribs 45 which are parallel to the ribs 32, 33 of the main fin section 21, which ribs 45 have full webs like the ribs 33. The tip is also provided with parallel skin stiffening formers or stringers 46 arranged parallel to the ribs 45. In addition, the tip is provided with rib elements 47 which extend at right angles to the ribs 45, 46. The rib elements 47 may be divided longitudinally to avoid the ribs 45 and laterally to leave open spaces in the center. The skin may be formed to provide nose stiffening elements 42 and the nose may be covered by a closure sheet 43, as above described for the leading edge.

As shown in Fig. 1, the fairing section 23 is provided with ribs 49 which are parallel to and preferably aligned with the ribs 32, 33 of the main fin section 21. The fairing section also includes a heavy base rib or bulkhead 50 for anchorage to the fuselage, as by bolts 51. At the leading edge it is provided with vertical stiffening means 52 and at the rear with a spar element 53 which supplements the front spar 25 at the lower end. The fairing section in fully assembled condition is secured to the main fin assembly by screws 54.

As shown in Figs. 2, 3 and 4, the full-webbed ribs 33 are formed by flanged webs 33a which are welded to the skin at their outer edges, as along flanges 60, and are welded together along their overlapping edges interiorly, as indicated at 61. On the inner edges the webs are strengthened by marginal flanges 63. Intermediately they are strengthened by longitudinal beads 64 and by flanges surrounding lightening openings 65, (Fig. 5). Transversely the webs are stiffened by flanged hat-shaped struts 66 which are arranged on opposite sides of the webs and have overlapping ends which are welded together when the webs are joined along their overlapping edges.

The open ribs 32 comprise flanged webs 32a secured through outer flanges 60a to the skin sheets 30 and marginally flanged interiorly as at 63a and interconnected at intervals by hat-section struts 66a which are spot welded thereto and which overlap each other and are spot welded together, as at 61a, in the final assembly operation, the spacing of the struts 66a being somewhat comparable to that of the struts 66 of the ribs 33.

As shown in Figs. 2 and 3, the nose rib elements 40 are formed of two webs 40a which overlap at their front extended ends where they are welded together, as indicated at 69. The webs are provided with outer flanges 70 welded to the skin 30, front end flanges 71 also welded to the skin, interior flanges 72 in their spaced-apart portions, and rear flanges 73 which are welded to the front spar chords 25.

The webs 47a of the vertical ribs 47 of the tip (Fig. 6) are very similar to the webs 40a of the nose edge ribs 30 and their parts are designated by the same reference numerals. The supplemental web elements 47b are flanged on all edges, as by cupping, and are secured through their outer flanges to the skin 30.

The webs 45a of the tip ribs 45 (Fig. 6) are similar to the webs 33a of the heavy ribs 33 and the same reference numerals are used for their parts, but the beads 64 and struts 66 may be omitted. They may be reinforced on their outer edges by L-shaped stringers 60b which are welded thereto and to the skin. A reinforcing plate 45b is secured beneath one of the ribs 45. The skin may be made in sections which are connected by the plate 45b prior to assembly.

The nose spar 25 (Figs. 2, 3, 5 and 7) comprises flanged channel chords 25a which are welded through their backs to the skin 30, a strengthening plate 25b, if desired, being interposed between each channel member and the skin. The skin may be made in sections which are connected by the plate 25b prior to assembly. The plates 25b are wider than the backs of the channel chords 25a and the adjacent rib webs are suitably joggled to receive the extended edges of the plate. A closure plate 74 is welded to the interior of each channel chord 25a and with it in effect forms a closed box spar chord on each side adjacent the skin which increases the torsional resistance of the channel chords 25a. There is left inside each box chord thus formed a wider channel and at intervals therein there are secured cupped strut elements 75 arranged back to back and welded together through their overlapping portions in the final assembly, as at 76. The spar strut elements 75 are preferably aligned with the adjacent rib element. The strut elements may be secured to the plate 74 before the plate is welded to the channel member 25a; and the latter is welded to the backing plate 25b and preferably also to the skin before the inner plate 74 is welded in. The side walls of the channel member 25a are welded to the end flanges 73 and 77 of adjacent rib elements 40 and 33a. As thus formed, the nose spar 25 is open between the ribs 32, 33 to permit welding tongs to be inserted from the rear open side to secure the nose webs 40a and the spar strut elements 75 together.

The rear spar 26 includes a web 79 and cap strips or chords 80 and 81 provided with rearwardly extending flanges which may be welded to the skin after the spar is set into position. An interposed plate 82 on each side reinforces the skin and may serve to join two skin sections together. Edge stringers 83 may be secured to the skin after the spar has been secured for the attachment of a rudder arch (not shown).

In Figs. 8 to 11 a modification is shown. Here the rib 133 includes the webs 133a which are provided with outer flanges 160 welded to the skin 130 and inner overlapping portions which are welded together as at 161. They are strengthened by interior flanges 163, transverse beads 164, and Z-shaped stiffening struts 166. The beads and ribs are disposed on opposite sides for the respective webs so as to avoid obstructing the overlapping faces of the webs which are to be welded together.

The nose rib elements 140 comprise the webs 140a which overlap at the front end for welding, as at 169. The webs 140a each includes an outer flange 170, a front end flange 171, strengthening beads 172, and notches 173 in the outer edge to receive the skin stiffening stringers 141. Nose stringers 142 are secured to the skin sheets and after their forwardly exposed flanges are welded together the space is covered by a closure sheet 143. The nose section may be covered by sheets 130a which are non-integral with the main sheets 130 and are overlapped and welded thereto at the spar, if desired. This construction is the one illustrated.

Spar chords 125a are secured to the inner side of each skin cover. These members are of flanged-channel or hat shape, as shown. The rib webs 133a extend forwardly past the front spar location and are recessed as at 134 to span the chords 125a. Reinforcing gussets 137, suitably flanged, are provided at the rib recesses 134. At the front end, the webs 133a are provided with flanges 177. Heavy channel-sectioned spar struts 139 are welded to opposite sides of the respective webs 133a at the front end, which struts are cut away at a bevel at the adjacent ends to permit welding through the overlapping webs in the final assembly operation.

The characteristics of the structure hereby provided are such that the fabrication of the airfoil is greatly facilitated. Each half is formed in a contoured form-fitting jig which is a replica of the shape of the corresponding part of the final airfoil. For example, considering the first embodiment of Figs. 1 to 7, three skin sections are welded together through the plates 25b (Figs. 2, 3 and 5) and 45b (Fig. 6). An alternative step here would be to use a single sheet for each side and to weld the plates to it. These skin assemblies are placed in form-fitting jigs and the shaped skin formers 31, 41 and 46 welded in. The channel chords 25a are then welded in place. The nose ribs 40, the main section ribs 32, 33 and the tip ribs 45, 47 are welded in place, and the elements 40, 32, and 33 are welded to the channel chords 25a. Next the channel closure plates 74 are welded into the widened space of the channel chords 25a. The spar struts 75 may have already been attached to the plates 74. At the outer edges they are welded with the closure plates to the outwardly and upwardly extending side flanges of the channel chords 25a. They are aligned with their corresponding rib elements.

The half-shells are placed in a full airfoil jig, and when properly clamped in position the juxtaposed overlapping rib elements are welded together. There is enough overlap in each rib and in the spar struts 75 to provide for this. The parts to be welded together are all in alignment, hence it is easy to make the welds by welding tongs inserted from the open rear edge. Bent welding tongs are required for the tip ribs 47, but since these ribs are open behind the nose ends, it is easy to insert the welding tongs from the rear.

The flanges of the nose stringers 42 are spot welded together from outside the assembly. Thereafter, the nose skin sheets 43 are secured over the connected nose stringers. They may be secured wholly from the outside by screws entered into previously placed fittings or they may be welded on, as shown, working partly inside, since this is still open from the rear. The procedure may be varied in accordance with the relative chordal width of the particular airfoil being constructed.

The rear spar 26 is inserted and secured from the rear after the airfoil has been assembled. The full width of the rear end of the airfoil is thus left open for the insertion of tools until the rear spar is brought in. The edge stiffeners 83, the hinge brackets 35, and the arch may be placed later. As an alternative, the edge stiffeners 83 may be placed before the rear spar, the skin being sufficiently flexible to permit the spar to be inserted past the stiffeners.

The fairing section 23 is also introduced later, either before or after the main assembly is secured to the anchorage structure.

The structure shown in the modification of Figs. 8 to 11 is so similar to the first form that no special explanation of the method of fabrication is needed. It may be noticed, however, that the second modification makes it somewhat easier to assemble the nose section half-shells together. A permissible variation in assembly procedure with either form, though requiring some special welding tools and varied procedure in the first form, is to secure the two nose half-shells together before they are secured to the main section half-shells.

It is thus seen that the invention provides an improved airfoil construction and an improved method of fabricating the same, all leading to economy and speed of production thoroughness of inspection, and strength, lightness and dependability in use. While spot welded connections have been shown throughout, it is to be understood that riveted connections may be used when desired.

While certain embodiments of the invention have been described in detail for purposes of illustration, it is to be understood that the invention may have various embodiments within the limits of the prior art and the scope of the subjoined claims.

What is claimed is:

1. A metallic construction comprising in combination, two separately fabricated parti-shells, each including a covering skin, fore rib elements, aft rib elements having a junction with the fore rib elements, transverse spar chords at the junction between the fore rib elements and the aft rib elements, and spar connecting strut elements at the said junction, said rib elements and said spar strut elements being aligned for each rib and the elements of the parti-shells being overlapped in the final assembly and secured together through their overlapping portions by shear elements inside the skin-covered assembly thus formed, the spar being open between its strut elements and between the ribs from one end to the other in the assembly to provide access from the edge for connecting the fore rib elements, the spar strut elements and the aft rib elements, as by rib-straddling welding tongs passed over an end of a rib.

2. A metallic construction comprising in combination, two separately fabricated parti-shells each including a covering skin, nose ribs, each including elements which overlap between their planes at their front ends and stand spaced apart at their rear ends when the parti-shells are assembled, main rib elements which overlap between their planes along their length when the parti-shells are connected, transverse spar chords at the junction of the nose and main ribs which stand spaced apart when the parti-shells are assembled, and spar connecting strut elements aligned with said rib elements which overlap between their planes when the parti-shells are assembled, the overlapping portions of said rib elements and spar strut elements being connected through their planes in the assembly.

3. A metallic construction comprising in combination, a nose section including spaced ribs each formed of plate-like part-ribs welded together through overlapping portions, and a metal skin covering on said ribs; a main section including spaced ribs each formed of plate-like part-ribs welded together through overlapping portions, and a metal skin covering on said main section ribs; and a transverse spar between said sections, said spar including spaced channel-shaped chords secured between adjacent front and main part-ribs on each side at the skin coverings, and spaced spar struts formed of strut elements welded together through overlapping portions, said struts and ribs being aligned chordwise of the ribs and said spar being open between said struts, and the main section being open from the trailing edge between the ribs, whereby the part-ribs and strut elements may be welded together inside from the trailing edge.

4. A metallic interiorly framed exteriorly covered structure, comprising in combination, chordwise extending nose ribs and main ribs and a transverse spar between them, said spar including channel-shaped chord elements or cap strips having in section a back and spaced sides and an open front secured to the skins through their backs leaving their open fronts facing each other, said chord elements having closing chord plates over their inner open fronts, and spar strut elements secured to said chord plates of each chord element, said strut elements being overlapped and secured together in the overlap.

5. A metallic interiorly framed exteriorly covered structure, comprising in combination, chordwise extending nose ribs and main ribs and a transverse spar between them, said spar including channel-shaped chord elements or cap strips having in section a back and spaced sides and an open front secured to the skins through their backs leaving their open fronts facing each other, said chord elements having closing chord plates over their inner open fronts, and spar strut elements secured to said chord plates of each chord element, said strut elements being overlapped and secured together in the overlap, said spar strut elements having their overlapping surfaces arranged transversely of the spar direction and parallel to the rib direction.

6. In an airfoil having a nose portion, a main portion, and a metallic skin covering extending over the opposite sides of said portions, a pair of opposed spanwise extending through-running channelled metallic stringer elements secured to the inner surfaces of said covering, one at each side between said nose and main portions, metallic main rib elements extending chordwise from said stringer elements throughout substantially the chordwise extent of said main portion, said main rib elements each embodying overlapping plate-like parts secured together through their overlapping portions, and each part of each main rib element being secured at its leading end to the adjacent stringer element, and a channelled metallic member rigidly secured to each rib element part at the leading end thereof, said channelled members overlapping each other with and being secured together through said rib element parts and extending substantially between said opposed stringer elements.

7. In an airfoil having a nose portion, a main portion, and a metallic skin covering extending over the opposite sides of said portions, a pair of opposed spanwise extending through-running channelled metallic stringer elements secured to the inner surfaces of said covering, one at each side between said nose and main portions, metallic main rib elements extending chordwise from said stringer elements throughout substantially the chordwise extent of said main portion, said main rib elements each embodying overlapping plate-like parts secured together through their overlapping portions, and each part of each main rib element being secured at its leading end to the adjacent stringer element, and a channelled metallic member rigidly secured to each rib element part at the leading end thereof, said channelled members overlapping each other with and being secured together through said rib element parts and extending substantially between said opposed stringer elements, the nose rib elements being secured to the stringer elements.

8. In an airfoil having a nose portion, a main portion, and a metallic skin covering extending over the opposite sides of said portions, a pair of opposed spanwise extending through-running channelled metallic stringer elements secured to the inner surfaces of said covering, one at each side between said nose and main portions, metallic main rib elements extending chordwise from said stringer elements throughout substantially the chordwise extent of said main portion, said main rib elements each embodying overlapping plate-like parts secured together through their overlapping portions, and each part of each main rib element being secured at its leading end to the adjacent stringer element, and a channelled metallic member rigidly secured to each rib element part at the leading end thereof, said channelled members overlapping each other with and being secured together through said rib element parts and extending substantially between said opposed stringer elements, the nose rib elements being secured to the stringer elements and to the main rib element parts.

9. A metallic structure comprising a first and second spaced covering skins and having at least one open edge, laterally spaced rib members extending in a first direction from said open edge and secured to the first of said skins, complementary spaced rib members extending from the second skin and each generally paralleling its corresponding first mentioned rib member, means connecting said rib members, said means including elements overlapping in planes parallel to said rib elements, a spar member secured to the first skin and extending in a direction transverse to the first direction, a complementary spar member secured to the second skin and extending generally parallel to the first spar member, means connecting said spar members, said last-mentioned means including elements overlapping in planes parallel to said rib elements, whereby the overlapping elements of the rib member connecting means and the overlapping elements of the spar member connecting means are disposed in parallelism so as to be readily secured together through said open edge of the structure.

10. A metallic structure as set forth in claim 9 further characterized by the fact that the connecting elements of the spar members are spaced apart sufficiently along the length of the spar members to provide working access between them.

11. A metallic structure as set forth in claim 9 which includes rib members on both sides of the spar members, said connecting elements of the spar members being spaced apart sufficiently along the length of the spar members to provide working access between them.

MICHAEL WATTER.